(12) United States Patent
Walton et al.

(10) Patent No.: US 8,908,919 B2
(45) Date of Patent: Dec. 9, 2014

(54) TACTICAL OBJECT FINDER

(71) Applicant: The Johns Hopkins University, Baltimore, MD (US)

(72) Inventors: William C. Walton, Severn, MD (US); Christopher M. Gifford, Laurel, MD (US); Marc A. Kolodner, Gaithersburg, MD (US); Donald A. Ruffle, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 84 days.

(21) Appl. No.: 13/893,542

(22) Filed: May 14, 2013

(65) Prior Publication Data

US 2013/0322742 A1    Dec. 5, 2013

Related U.S. Application Data

(60) Provisional application No. 61/652,461, filed on May 29, 2012.

(51) Int. Cl.
*G06K 9/00* (2006.01)
*G06K 9/62* (2006.01)

(52) U.S. Cl.
CPC ............ *G06K 9/0063* (2013.01); *G06K 9/6262* (2013.01); *G06K 9/6288* (2013.01)
USPC .......................................... 382/103; 382/141

(58) Field of Classification Search
USPC ........................ 382/103, 141–152; 378/57–69
See application file for complete search history.

(56) References Cited

U.S. PATENT DOCUMENTS

| | | | |
|---|---|---|---|
| 4,497,065 A | 1/1985 | Tisdale et al. | |
| 5,408,541 A | 4/1995 | Sewell | |
| 5,631,970 A | 5/1997 | Hsu | |
| 6,804,386 B1 * | 10/2004 | Nakayama et al. | 382/141 |
| 6,963,669 B2 | 11/2005 | Blosser | |
| 7,609,877 B2 | 10/2009 | Carlson et al. | |
| 8,170,272 B1 | 5/2012 | Joslin et al. | |
| 8,243,991 B2 | 8/2012 | Das et al. | |
| 8,275,172 B2 | 9/2012 | Wilby et al. | |
| 8,280,140 B2 | 10/2012 | Levenson et al. | |

* cited by examiner

*Primary Examiner* — Brian Le
(74) *Attorney, Agent, or Firm* — Noah J. Hayward

(57) ABSTRACT

A detection system includes processing circuitry configured to receive overhead image data divided into a plurality of image chips and receive metadata associated with the image data. The metadata includes ground sample distance information associated with the image data and provides an indication of ground area represented by each pixel within the image chips. The processing circuitry is further configured to screen the image chips for candidate detections based on a multi-stage screening process and determine whether to classify candidate detections as target detections. The process includes an intensity based screening stage, an object extraction stage that employs binary shape features to extract objects from detect positions identified based on an output of the intensity based screening stage, and a candidate detection identification stage employing template based and structural feature criteria to identify candidate detections from an output of the object extraction stage.

20 Claims, 8 Drawing Sheets

TACTICAL OBJECT FINDER

CROSS-REFERENCE TO RELATED APPLICATIONS

This application claims the benefit of U.S. Provisional Application No. 61/652,461 filed on May 29, 2012, the entire contents of which are hereby incorporated herein by reference.

STATEMENT OF GOVERNMENTAL INTEREST

This invention was made with government support under contract number N00024-03-D-6606 awarded by the Naval Sea Systems Command (NAVSEA). The government has certain rights in the invention.

TECHNICAL FIELD

Exemplary embodiments of the present disclosure generally relate to image screening and detection technology, and more specifically relate to employment of screening technology that may assist in the classification of objects of interest within image data gathered using satellite imagery.

BACKGROUND

Satellite imagery has many uses in the modern world. The study of weather, geology and numerous other scientific areas can be further advanced with the assistance of satellite imagery. Satellite imagery can also form a valuable tool in connection with the performance of intelligence gathering.

Intelligence gathering on the basis of aerial viewing is a technique that is well over a century old. However, with the advancement of technology, the ability to obtain useful views of the ground from higher and higher altitudes has also improved. The desire to move to higher altitudes has been driven by the desire to remain both undetected and safe while conducting surveillance. With satellite imagery, image data can be gathered with relatively little risk to the assets gathering the data and without any noticeable indication to the party being monitored that active monitoring is occurring. Thus, the use of satellite imagery for intelligence gathering continues to be an important endeavor.

However, as the ability to obtain high resolution images of objects on the ground improves, the amount of data that must be analyzed and the complexity associated with analyzing the data also increases. Thus, it is necessary to develop techniques for analyzing the massive amounts of high resolution data in a way that can enhance the value of the results of the analysis.

BRIEF SUMMARY

Some example embodiments may enable the provision of a system capable of undertaking the potentially complicated task of isolating specific objects of interest from the image data that can be obtained from satellite imagery. In this regard, some example embodiments may define a series of image processing steps for improving screening and classification performance. In some cases, example embodiments may employ a screening process to filter image data to isolate a reduced set of candidate detections so that a trained classifier can operate on the reduced set to perform decision fusion.

In one example embodiment, a detection system is provided. The detection system may include processing circuitry configured to receive overhead image data divided into a plurality of image chips and receive metadata associated with the image data. The metadata includes ground sample distance information associated with the image data and provides an indication of ground area represented by each pixel within the image chips. The processing circuitry is further configured to screen the image chips for candidate detections based on a multi-stage screening process and determine whether to classify candidate detections as target detections. The multi-stage screening process includes an intensity based screening stage, an object extraction stage that employs binary shape features to extract objects from detect positions identified based on an output of the intensity based screening stage, and a candidate detection identification stage employing template based and structural feature criteria to identify candidate detections from an output of the object extraction stage. Final classified outputs may be geo-coded, including geo-positioning uncertainties.

In another example embodiment, a method of detecting targets is provided. The method may include receiving overhead image data divided into a plurality of image chips and receiving metadata associated with the image data. The metadata includes ground sample distance information associated with the image data and provides an indication of ground area represented by each pixel within the image chips. The method may further include screening the image chips for candidate detections based on a multi-stage screening process and determining whether to classify candidate detections as target detections. The multi-stage screening process includes an intensity based screening stage, an object extraction stage that employs binary shape features to extract objects from detect positions identified based on an output of the intensity based screening stage, and a candidate detection identification stage employing template based and structural feature criteria to identify candidate detections from an output of the object extraction stage. Final classified outputs may be geo-coded, including geo-positioning uncertainties.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
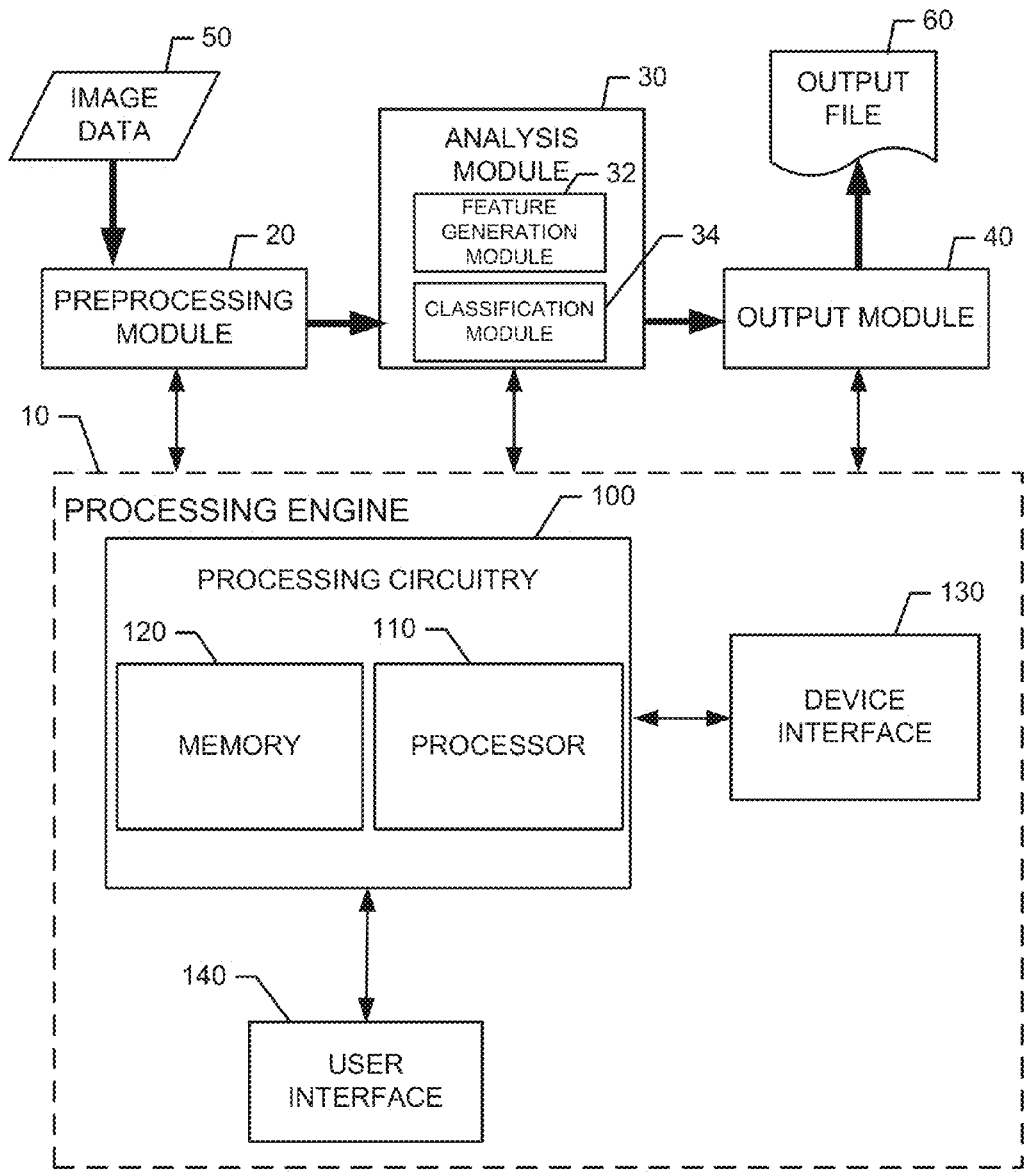
FIG. 1 illustrates a block diagram showing one example of a detection system of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may enable the provision of a mechanism by which to analyze satellite image data to isolate targets or objects of interest therein. Accordingly, example embodiments may utilize above-ground image data gathered by any method, although panchromatic satellite image data is employed in one embodiment, to perform such analysis. The analysis may include a multi-stage, hierarchical process in which objects in a scene are detected and gradually screened against using a variety of image processing measures, statistical pattern recognition techniques, and/or advanced classification algorithms. The result may be a set of candidate objects that exhibit properties similar to those of a desired target or object of interest. In some cases, the object of interest may have a particular shape. Thus, the screening process and classification may be accomplished utilizing feature or characteristic criteria that is highly geometric in shape, and corresponds to the particular shape.

The process output may be provided as a set of image chips, corresponding pixel and geolocation information, a label (e.g., identifying a state or classification of the object), and a confidence level associated with each detected object. The analysis may be performed by a detection system comprising various hardware and/or software components. FIG. 1 illustrates a block diagram showing one example of a detection system of one example embodiment.

In the example of FIG. 1, the detection system is embodied as a computer controlled device. Thus, for example, the detection system may include various modules that may operate under the control of a processing engine 10 that may be referred to as a tactical object finder. The processing engine 10 may be configured to control operation of a pre-processing module 20, an analysis module 30 and an output module 40. In an example embodiment, the analysis module 30 may further include a feature generation module 32 and a classification module 34. Image data 50 may be provided to the pre-processing module 20, which may condition the image data 50 for the analysis module 30. The analysis module 30 may perform analysis on the image data 50 that has been conditioned or pre-processed in order to identify candidate detections or targets/objects of interest. The candidate detections may have a decision fusion process performed thereon before the output module 40 generates an output file 60 that can be provided to an analyst or otherwise reviewed by authorized parties.

Each respective module may perform one or more functions that will be described in greater detail below. However, it should be appreciated that although this example is described in terms of separate modules corresponding to various functions performed, some examples may not necessarily utilize modular architectures for employment of the respective different functions. Thus, for example, code may be shared between different modules, or the processing engine 10 itself may be configured to perform all of the functions described as being associated with the modules described herein.

In an example embodiment, the processing engine 10 may coordinate or control operation of the modules so that, for example, image data 50 is pre-processed in the pre-processing module 20. The pre-processing module 20 may be configured to receive the image data 50 and read header information and metadata associated with the image data 50. The pre-processing module 20 may be further configured to extract image data as a collection of image tiles for passing of the image tiles on to the analysis module 30.

In some embodiments, the image data 50 may be provided in real time, substantially real time, or from a storage buffer or memory device. The image data 50 may be converted or otherwise provided in a consistent format such as, for example, the National Imagery Transmission Format (NITF) file standard. However, imagery may alternatively be stored in or converted to other suitable formats as long as the image data 50 includes metadata indicative of the ground sample distance (GSD) associated with the imagery. The GSD may provide an indication of the size of a pixel on the ground or, alternatively, the smallest discernible distance between two objects. Thus, for example, a GSD of 1m would mean that a relatively small object (such as a compact automobile or similarly sized object) can be discerned to some degree. Metadata extracted by the pre-processing module 20 may include orientation information such as image resolution, geo-positioning information, tile size, and/or the like. In some cases, the metadata may further include sensor model information. The metadata may therefore include information that facilitates orientation of the analysis module 30 relative to the parameters that enable navigation throughout the image tiles. The orientation information may be stored in data structures that can be used by other modules.

The analysis module 30 may be configured to perform screening and classification functions for the detection system. In an example embodiment, the analysis module 30 may include the feature generation module 32, which may be configured to perform hierarchical image screening and feature generation. In this regard, the feature generation module 32 may be configured to perform a series of screening steps to scan the image tiles and isolate a set of candidate detections for the classification module 34 to analyze for decision fusion, which will be described in greater detail below. The result of the decision fusion processing that is performed by the classification module 34 may include a label for association with one or more (or each) of the candidate detections along with a corresponding confidence score. The label and confidence score generated by the classification module 34 may then be provided to the output module 40 so that the output module 40 can generate the output file 60.

As shown in FIG. 1, the processing engine 10 may include or otherwise be in communication with processing circuitry 100 that is configurable to perform actions in accordance with example embodiments described herein. As such, for example, at least some of the functions attributable to the processing engine 10 may be carried out by or otherwise instructed by the processing circuitry 100. The processing circuitry 100 may therefore provide the hardware for hosting software to configure the system for machine learning and machine driven analysis techniques consistent with example embodiments. Detection of targets/objects of interest and delineation of labels and confidence scores for consumption by analysts or other authorized parties may then be accomplished using the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard).

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, printer, one or more buttons or keys (e.g., function buttons), and/or other input/output mechanisms (e.g., keyboard, touch screen, mouse, microphone, speakers, cursor, joystick, lights and/or the like). The user interface 140 may display information indicating an identity or certain characteristics of a data set (e.g., including images or results of analyzing images) being processed by the processing engine 10. The characteristics of the data set may then be processed and information associated therewith may be presented on a display of the user interface 140 based on instructions executed by the processing circuitry 100 for the analysis of the data according to prescribed methodologies and/or algorithms. Moreover, in some cases, the user interface 140 may include options for selection of one or more reports to be generated based on the analysis of a given data set.

The device interface 130 may include one or more interface mechanisms for enabling communication with other external devices (e.g., output devices, input devices and/or the like) or internal functional components of the detection system. In some cases, the device interface 130 may be any means such as a device or circuitry embodied in either hardware, or a combination of hardware and software that is configured to receive and/or transmit data from/to devices in communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the processing engine 10 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns, image data, feature data, processing algorithms and/or the like to be employed for the execution of example embodiments. Among the contents of the memory 120, applications may be stored for execution by the processor 110 in order to carry out the functionality associated with each respective application. In some cases, the applications may include directions for control of the processing engine 10 to generate and/or employ analytical tools for analyzing image data to identify targets/objects of interest and label the same along with the provision of a confidence score. In some cases, the applications may further include directions for generating outputs and/or reports associated with analysis of image data as described herein.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the processing engine 10. As such, in some embodiments, the processor 110 (or the processing circuitry 100) may be said to cause each of the operations described in connection with the processing engine 10 and/or the modules by directing the processing engine 10 and/or the modules to undertake the corresponding functionalities responsive to execution of instructions or algorithms configuring the processor 110 (or processing circuitry 100) accordingly.

In an example embodiment, data captured in association with satellite imagery gathering may be stored (e.g., in the memory 120) or passed directly to the processing engine 10 in a suitable format. Thereafter, the data may be processed by the processing engine 10 using each of the modules described herein to enable the processing circuitry 100 to process the data in real time (or near real time) or to process the data after the data is extracted from memory.

In an example embodiment, each of the pre-processing module 20, the analysis module 30, the feature generation module 32, the classification module 34 and the output module 40 may be any means such as a device or circuitry embodied in either hardware, or a combination of hardware and software that is configured to perform the corresponding functions of respective ones of the pre-processing module 20, the analysis module 30, the feature generation module 32, the classification module 34 and the output module 40 as described herein under the control of the processing circuitry 100.

Figure 2:
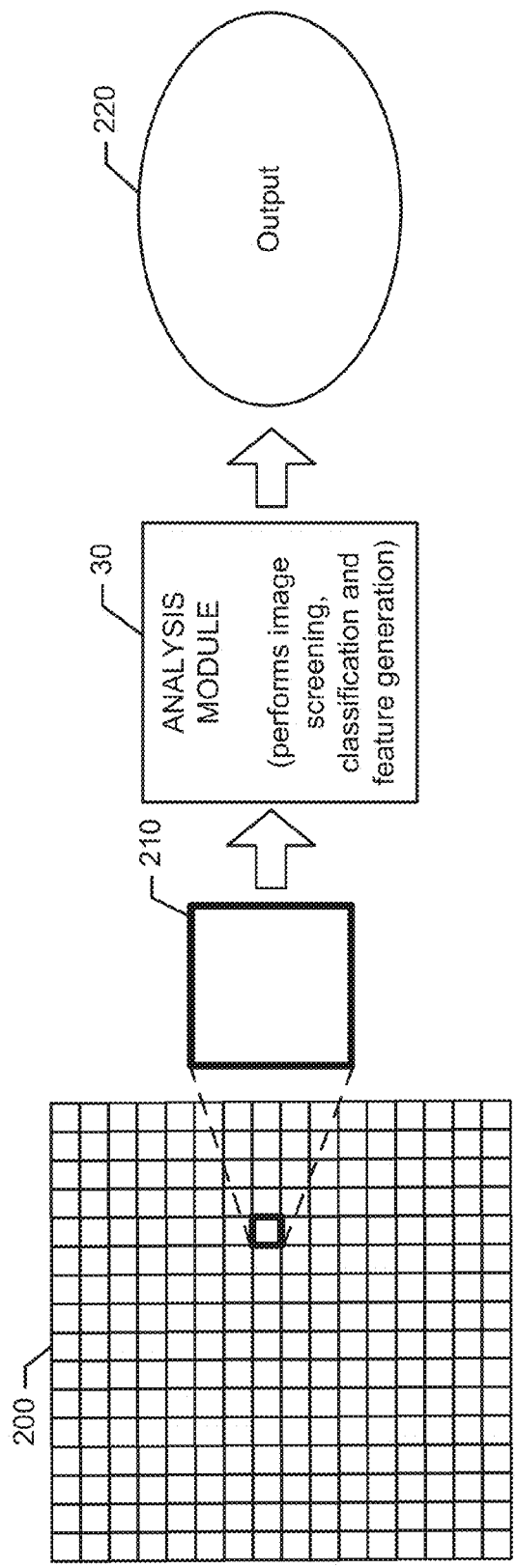
FIG. 2 illustrates a satellite image that may be divided into a plurality of image tiles via a pre-processing module of an example embodiment.

A high level description of the operation of an example embodiment will now be described in reference to FIG. 2. FIG. 2 illustrates a satellite image 200 that may be divided into a plurality of image tiles 210 via the pre-processing module 20 of an example embodiment. Each of the image tiles 210 may be processed independently by the analysis module 30 so that image screening and feature generation may be performed. A number of candidate detections 220 may be detected within each of the image tiles 210.

In some cases, the satellite image 200 may be a relatively large image file (e.g., greater than 1 GB). Thus, the satellite image 200 may include tens of thousands to hundreds of thousands of pixels stored in a format such as NITF. Various metadata may also be included in or associated with the satellite image 200. Given this massive amount of data, identification of targets/objects of interest may be facilitated by the use of the detection system of an example embodiment.

Each of the image tiles 210 may include a predetermined number of pixels (e.g., 1024×1024) forming a block. The analysis module 30 may employ, for example, a three stage screening process that has multiple operational modes and employs a plurality of image processing steps to calculate various statistical features. Sensor metadata may be useful in facilitating the operation of the analysis module 30. Thereafter, the output 220 of the system may be provided in the form of an output structure that includes information for each candidate detection that may be indicative of the location thereof (e.g., coordinates {x,y}). In some embodiments at least eighty or more features may be identifiable relative to each object or candidate detection within each of the image tiles 210. The output structure may provide a relatively efficient way to store and consume results. In some embodiments, features and classifier models may be normalized using GSD. Furthermore, in some cases, the sensor model information may be employed in connection with mensuration data stored in a mensuration library to facilitate the provision of accuracy information associated with each respective target detection identified in the output structure. Sensor model information could also, in some cases, be employed in connection with the mensuration library for use in filtering or performing other tasks associated with the analysis module 30.

Figure 3:
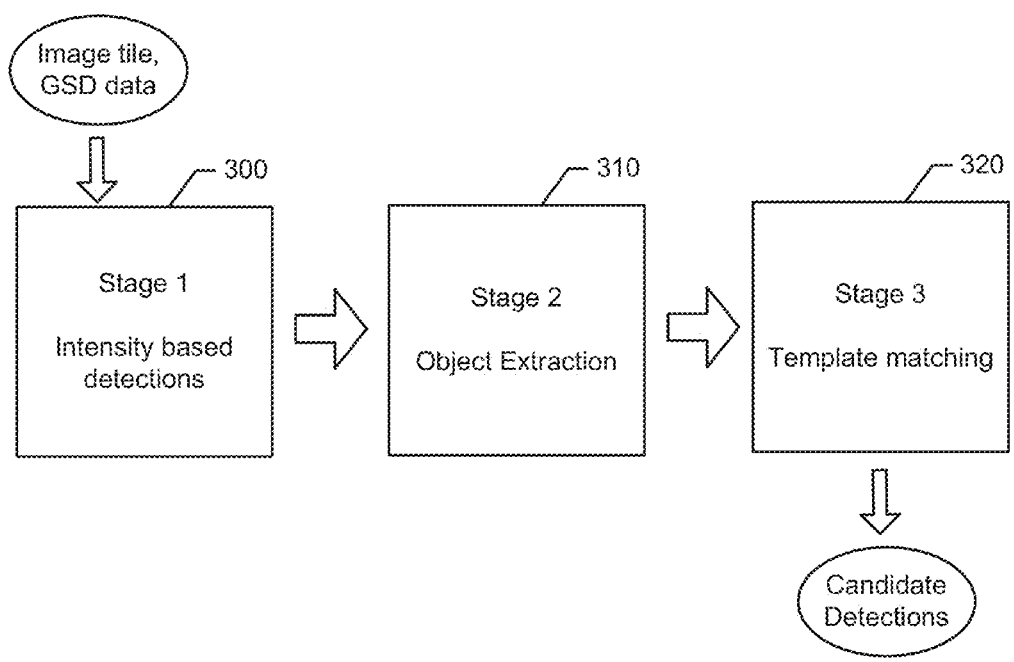
FIG. 3 illustrates a diagram of each screener stage along with operations that may be performed in various modes for each stage according to an example embodiment.
Figure 4:
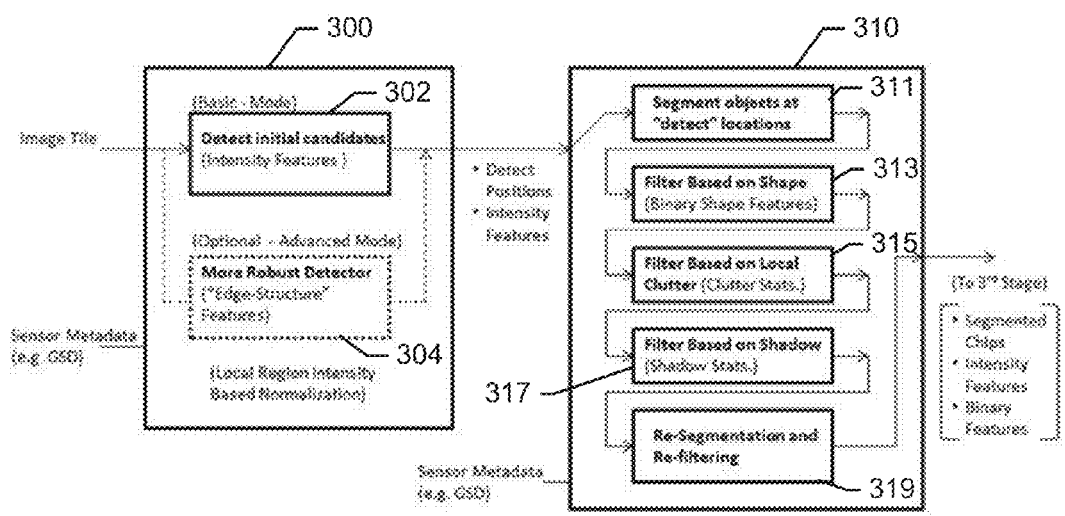
FIG. 4 is a block diagram of operations associated with the first and second stages of the screening process according to an example embodiment.
Figure 5:
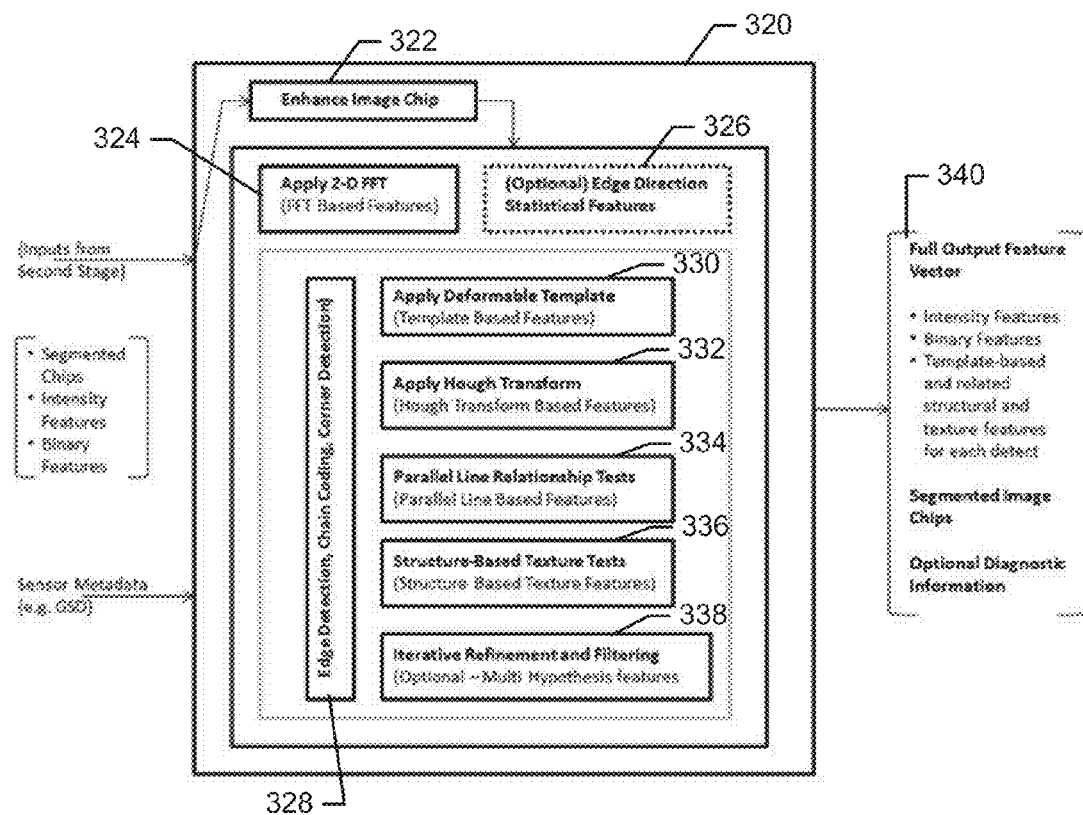
FIG. 5 is a block diagram of operations associated with the third stage of the screening process according to an example embodiment.

The three step hierarchical screening process of one example embodiment will now be described in reference to FIGS. 3-5. FIGS. 3-5 therefore may represent functionalities executed by the feature generation module 32 of an example embodiment. In this regard, FIG. 3 illustrates a diagram of each screener stage along with operations that may be performed in various modes for each stage according to an example embodiment. FIG. 4 is a block diagram of operations associated with the first and second stages of the screening process according to an example embodiment. FIG. 5 is a block diagram of operations associated with the third stage of the screening process according to an example embodiment.

The first step of the screening process (e.g., stage 1, operation 300) may include a high-level and relatively fast scan of the image 200. Of note, each image tile 210 may be processed individually and sequentially (or in parallel) to complete scanning of the image 200. The image tiles 210 conditioned by applying contrast enhancement operations to make objects of interest easier to detect by subsequent algorithms and operations. The image tiles 210 may also be scanned for foreground and/or background intensity variations in basic mode operation or may be scanned for edge structure detection for advanced mode operation. Filtering may be accomplished based on intensity thresholds. Various image statistics may be calculated and used to identify potential points of interest in the image tiles 210. Some intensity based statistics may be normalized with respect to intensity ranges within local image regions. The pixel locations for the points of interest may be stored along with various statistical properties and passed along to stage 2 (operation 310) along with sensor metadata and other diagnostic information such as control settings.

Stage 2 (operation 310) may include object extraction. In some embodiments, stage 2 may be accomplished by employing image segmentation and object extraction algorithms for each pixel location identified from stage 1. In accordance with basic mode operation, segmentation using intensity based detections may be employed. In accordance with advanced mode operation, segmentation using edge and intensity based detections may be employed. Filtering may be accomplished based on binary shape features and detection of spatial proximity. In some embodiments, a binary (two-intensity) image representing the shape of an object at the pixel locations identified from stage 1 may be generated as part of the intensity based detection processing. The resulting segmented objects may be screened against geometrical and morphological constraints in order to filter out objects that do not fit the desired criteria. Additional filtering based on "shadow hypothesis" information and "local clutter statistics" may also be performed in stage 2. In some cases, screen constraints applied may be dependent upon the operational mode. Both the grayscale and binary segmented chips, along with shape based measures from stage 2 may be stored in an index structure that is passed on to stage 3 (operation 320). Diagnostic information may also be passed on to stage 3.

In the third step of the screening process (i.e., stage 3, operation 320), multiple template-matching and structure detection based operations may be invoked, which may result in the computation of additional features. The primary feature mechanism may include a deformable template mechanism that may be applied to each candidate-segmented object. In some cases, Hough Transform, 2-D Fourier Transform (FFT), and/or additional edge-based features may be computed. Hough Transform features may be geared toward providing indications of parallel linear structures in a scene. FFT features may be derived from the FFT power spectrum magnitude and angle information. The edge-based measures may involve edge gradient magnitude and direction information derived from the edge gradient density. This edge information may serve as a texture type measure, but may also give information on the structure that is present in the scene or tile. In other words, an indication of the shape of the object and what the object looks like may be determined.

Numerous measures may be computed from various template and structure detection techniques that may be employed in stage 3. Some of the measures may be normalized based on GSD. Thus, for example, GSD may be used to compute normalized features to enable creation of a scale-invariant classifier model. Furthermore, in some cases, the underlying processes may also involve image processing steps such as chain coding, corner detection and iterative optimization. In stage 3, objects that do not fit a certain criteria may be flagged, but may not necessarily be filtered out.

In some embodiments, at the end of stage 3, a greatly reduced set of candidate detections may remain (based on either screening from prior stages or flagging in stage 3). Moreover, in some cases, over 80 features may exist for each candidate at the end of this stage (cumulatively from all three stages). Each of the candidate detections that remains after stage 3, along with statistical and image processing features that were collected at each step of processing may then be stored (e.g., in memory 120) in a structure to be passed on to the classification module 34. In this regard, for example, in stage 1, intensity based features may be collected or generated. Stage 1 features may include relative intensity measures based on "detect" region versus background region, various derived intensity features and ratios, and a regional-intensity normalized version of the features above. Stage 2 features may include binary shape based features such as, for example, semi major and minor axis length and ratios, eccentricity, Euler number, area and perimeter measures for a given shape, and GSD normalized versions of the above-listed stage 2 features. Stage 3 features may include template and structure based features. Thus, for example, stage 3 features may include power spectrum, directionality and scale-based features associated with FFT, geometrical structure and related texture features associated with a deformable template, linear object structure and related texture features associated with Hough Transforms, parallel line-based measures and related texture features, and/or optional edge features such as edge coarseness, contrast and directivity.

Referring to FIG. 4, operation 300 may include detection of initial candidates based on intensity features at operation 302 in a basic mode. In an optional advanced mode, a more robust detector may be employed at operation 304 to consider edge-structure features. During stage 2 (operation 310), segment objects may be detected at "detect" locations at operation 311. Thereafter, filtering based on shape may be conducted at operation 313. Filtering based on local clutter may then be accomplished at operation 315 prior to filtering based on shadows at operation 317. Finally, at operation 319, re-segmentation and re-filtering may be accomplished before progressing to the third stage. FIG. 5 shows third stage operation (operation 320) which may begin with enhancement of image chips at operation 322. FFT based features may be determined at operation 324. In some cases, optional edge direction statistical features may be analyzed at operation 326. Edge detection, chain coding, corner detection and/or the like may be performed at operation 328. At operation 330, a deformable template may be applied to detect template based features. At operation 332, a Hough Transform may be applied and at operation 334, parallel line relationship tests may be applied to detect parallel line based features. Structure based texture features may be detected using structure based texture tests at operation 336 and multi hypothesis features may be optionally detected using iterative refinement and filtering at operation 338. Thereafter, a full output feature vector 340 may be defined including intensity features, binary features, template-based and related structural and texture features for each candidate detection. Segmented image chips may therefore be provided with optional diagnostic information.

The output of the feature generation module 32 may then be provided to the classification module for multi-classifier decision fusion. Decision fusion may be accomplished by using the feature data provided by the feature generation module 32 with respect to each of the candidate detections as an input to a set of one or more trained classifier models. The trained models may employ decision fusion methods or a meta classifier as described herein to provide labels to candidate detections along with corresponding confidence levels. In some embodiments, the labels may define one of a predetermined number of categories that may relate to classifying a candidate detection as a target (or one of multiple distinct target classifications) or non-target (e.g., clutter). The confidence value may be a binary state or a discrete value between a maximum and minimum level (e.g., 0 and 1). In examples where C classifiers are employed, the classification module 34 may generate C labels and corresponding confidence levels (e.g., one for each classifier) and decision fusion may be used to consider the C labels and confidence levels for each candidate detection and generate a decision fusion output that combines the labels/confidence levels according to a predetermined strategy.

In an example embodiment, decision fusion may be performed for each candidate detection by mathematically combining the C labels using a "select best" strategy in which the best individual classifier from the selected set is used to determine the decision fusion output. In such an example, the classifier having the highest testing accuracy may be used as the classifier output that forms the decision fusion output. As an alternative, a "max confidence" strategy may be employed in which the confidence levels for each classifier are compared and the output of the classifier with the highest confidence level is selected as the decision fusion output. In yet another example, an "average confidence" strategy may be employed in which the confidence levels for each classifier are averaged in order to fuse the confidence levels of each class. The class corresponding to the highest average confidence may then be used as the decision fusion output. In some cases, a "majority vote" strategy may be employed in which, for each candidate detection, votes are accumulated for each class from the set of classifiers to fuse. The class with the highest vote count is then selected as the decision fusion output. In this method, each vote is 1.0 (full, non-weighted vote). In a "weighted vote" strategy, votes are accumulated for each class from the set of classifiers to fuse for each candidate detection. The class with the highest vote count is then selected as the decision fusion output. However, each vote is weighted by the classifier's testing accuracy. Thus, the vote of weak classifiers counts less (e.g., 0.5) and the vote of strong classifiers may count more (e.g., 0.99). As an alternative approach, the detection system of an example embodiment may perform decision fusion via utilization of a meta classifier model (e.g., a classifier model created from patterns of outputs from individual classifier models).

As indicated above, the output of the decision fusion process is a single label and a combined confidence level for each candidate detection that represents the consensus decision from the ensemble of trained classifier models based on the utilized decision fusion method. If only a single classifier (C=1) is used in the system for labeling candidate detections, the decision fusion process may not need to be utilized. Labels and confidence values for all candidate objects may then be provided to the output module 40, which may perform further filtering, organizing and/or outputting to file.

Figure 6:
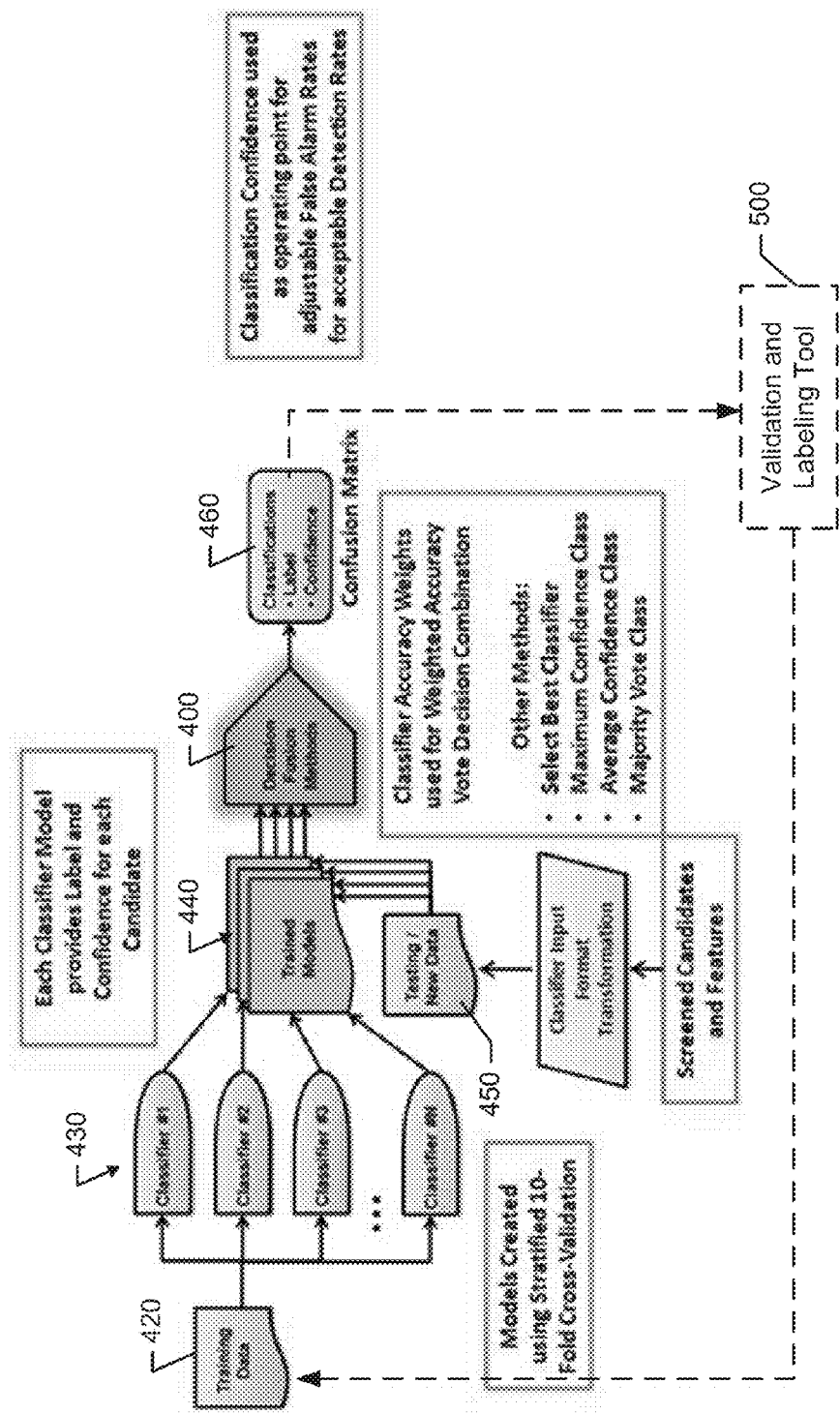
FIG. 6 illustrates a block diagram of a decision fusion process involving decision fusion methods according to an example embodiment.
Figure 7:
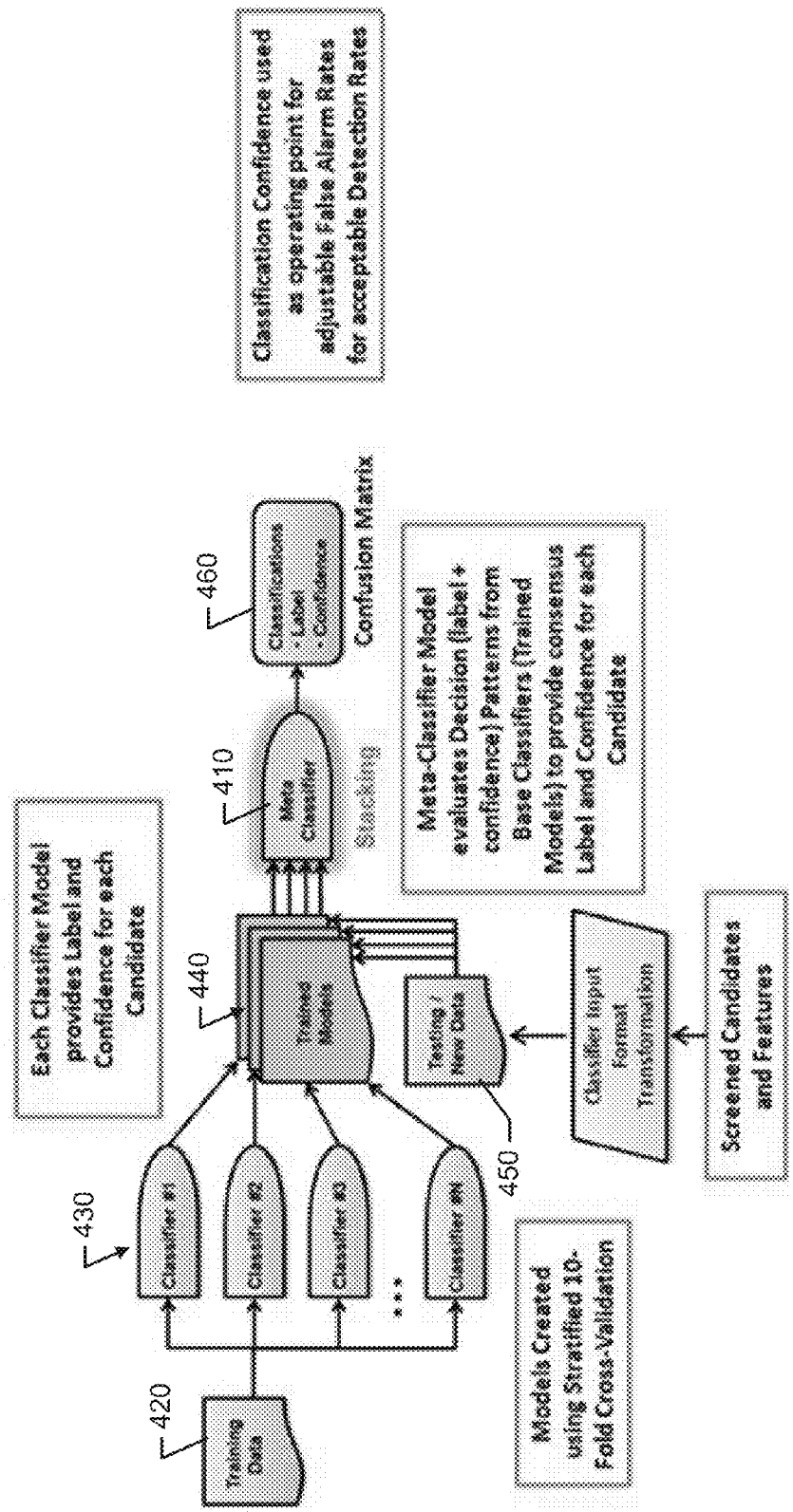
FIG. 7 illustrates a block diagram of a decision fusion process involving a meta classifier according to an example embodiment.

FIG. 6 illustrates a block diagram of a decision fusion process involving decision fusion methods 400 according to an example embodiment, and FIG. 7 illustrates a block diagram of a decision fusion process involving a meta classifier 410 according to an example embodiment. As shown in FIGS. 6 and 7, training data 420 may be provided to a plurality of classifiers 430 that may be used to train a plurality of models 440. The trained models 440 may receive testing data 450 (e.g., new data in the form of image data 50 that has been conditioned and screened as described above). In FIG. 6, the trained models 440 may provide an output to decision fusion methods 400 that may employ any of the selection method described above to generate classifications 460. In FIG. 7, instead of the decision fusion methods 400, the trained models 440 may provide an output to the meta classifier 410, which may generate the classifications 460.

In an example embodiment, the output module 40 may be configured to perform additional processing on the output generated by the classification module 34 (which output may include the label and confidence level for each candidate detection). In some embodiments, the additional processing that the output module 40 may be enabled to perform may include elimination of candidate detections that do not meet certain specified size, dimension ratio, color profile constraints, or other user specified criteria. Additionally or alternatively, the output module 40 may be configured to eliminate candidate detections that do not meet specified classifier confidence criteria or that are labeled as clutter with a confidence level above a predefined threshold. Candidate detections that survive the constraints listed above may be referred to as target (or object) detections (instead of candidate detections), and may be output to a file in an organized manner such that all target detections of an object of interest in each processed image may be output and stored together. Each target detection's image chip may be saved for later analysis, along with details regarding the target detection. Some examples of such details may include a unique identifier that may include an image filename and candidate object number, a date/time identifier indicating the time and date that the satellite image was taken by a sensor, an X/Y pixel location identifying a location of a center of detection in a satellite image, latitude/longitude/elevation information indicative of the geospatial location of a center of detection on the surface of the earth with specified accuracy ellipses, a label defining one of two valid target or object of interest labels to indicate that state of the target detection, a confidence value (e.g., from 0 to 1 to indicate the system confidence in the label), a size identifier (e.g., in square feet), a color descriptor, and/or an associated image chip including the chip that contained the detection.

A variety of details about the input image may be stored to file, including source of the input image, sensor, security level, and geospatial boundary coordinates for the image. KML and CSV representations of the detections may also be saved for further analysis and overlay with other data sources. Such information may be made available to analysts and post-processing tools for further validation and use. In some embodiments, the detection system may employ a sensor model that utilizes external reference elevation data to improve geopositioning accuracy. The process may result in a 3D geo-location (e.g., latitude, longitude and elevation) along with "uncertainty" information for each detection. In "fusion" scenarios in which detections form multiple, independent image files are assessed in terms of position proximity, the uncertainty information may be used as a mechanism for weighting detection locations appropriately.

The processing engine 10 in some embodiments may employ driver scripts that may operate at two levels including processing of individual files and processing of all files in a specified directory. Such two-level processing capability may enable the automatic processing of large volumes of imagery data in an unattended manner to produce areas of interest that may include objects of interest over time and space. The user interface 140 of one example embodiment of the processing engine 10 may include a detection viewer that may be referred to as an analyst validation and labeling tool. The analyst validation and labeling tool may be employed to inspect the image chip of a target detection and its corresponding details, to validate/discard detections, and to revise reliable detections by displaying the image chip, label, confidence, geolocation, and accuracies for each detection. Analysts may take notes regarding observations or other supporting data. All actions within the tool may be attributed to the analyst that performed the action and the time the action was performed by a login process. The viewer can therefore operate on detections from a single file or a directory of processing result directories. Accordingly, the analyst may be enabled to ensure that outputs are accurate, and also view the system's detections for additional context and decision support. The viewer may also save output products (e.g., CSV and KML files of validated detections) that can be used for further analysis and GIS overlay with other data.

In some embodiments, prior to executing the detection system processes described above, a data labeling and classifier training processes may be conducted. Data labeling involves running the detection system screening functionality on a set of known training images with the screener in a training mode. Training mode may include at least two differences from operational modes. The first such difference is that each sample input image may be subjected to the entire screening process several times using a different histogram modified version of the image. Other steps may also be applied such as image rotations, distortions, and noise additions. The effect of this processing may be to simulate different lighting conditions and different material and background intensity variations. This process may help to provide a training set that is potentially more representative of the various characteristics of satellite (and other overhead-type) imagery that may be obtained pending atmospheric, seasonal, diurnal variations and sensor variations.

The second difference between training and operational modes may be that in training mode, spatial size constraints (e.g., used for filtering out detections) may be relaxed so that a wider variety of objects may be passed through the entire system. Again, this may be accomplished in order to help to generate a robust set of training data for classifier development. A custom object labeling tool may be included to manually label each object (from the screening output) by category. In one example, labeling by category may include labels such as, for example, target-1, clutter-2, other-9, or any other suitable nomenclature. The result of the labeling process may be that a structure that contains a feature vector and a label for each detected object in the training data is provided.

Classifier training may include the creation of a series of classifier models via a training and evaluation procedure. In some cases, the labeled training data may be subjected to various classifier models and ensemble configurations. Each resulting classifier model may be evaluated for performance, in terms of true positives, false positives, and processing time. Ultimately, a set of C trained classifier models is selected for use in the detection system as the primary method for automatically classifying candidate detections. Examples of classifiers available in the system may include a C4.5 decision tree (pruned or unpruned), a random forest, a decision table, a support vector machine, naïve Bayes, K-nearest neighbors, K*, neural networks, radial basis function networks, logistic regression, and/or the like. In some cases, 10-fold cross validation may be used to train and evaluate a series of classifiers to determine which C classifiers offer suitable performance for the domain and application. These classifiers may be leveraged for decision fusion within the detection system. Optionally, the meta classifier may be trained and evaluated in a similar fashion, using decision patterns from each of the selected trained models for the training data to be used for decision fusion within the detection system. Once a set of classifiers is determined, the detection system may operate on one or more images to discover the objects of interest therein.

In some embodiments, an iterative feedback and adaptive retraining methodology may be integrated into the process flow. In this regard, for example, FIG. 6 illustrates (in dashed lines to show the optional nature of the modification) the addition of a validation and labeling tool 500 that can be used to capture analyst validation of the labeling as a feedback mechanism. Validated labels (both target and clutter) may be captured and used for iteratively retraining the underlying core classifier models. The classifier system may automatically update and employ classification models when the classifier models reach a certain age or a certain number of processed images that have been validated. Such a feedback system may improve system performance and accuracy (e.g., reduce the false alarm rate and improve detection rates) over time, both as the system continues to run and as analysts continue to validate system outputs.

Example embodiments may therefore provide for a specific set of features to be used for screening. Screened features may also be used to train a set of classifiers and to classify candidate detections. The set of features represents a robust set of discriminative criteria for identifying objects or targets of interest. For example, the use of template matching and structure detection algorithms, which may include deformable templates, Hough Transforms, FFT based angle measures, parallel line based measures, and/or edge directivity measures, may define a mechanism by which to employ (individually or collectively) a comprehensive set of tools for identifying targets or objects of interest in overhead imagery such as satellite imagery. Example embodiments also employ image data that include information indicative of ground sample distance (GSD) to create a scale-invariant classifier model that is capable of robust performance against image data that could be input with any of a number of different scales. Sensor look angles and target elevation angles are therefore not required for operation of example embodiments.

The trained classifier models of an example embodiment, coupled with decision fusion methods that utilize the classifier models, may provide a robust set of models that can be tuned for high accuracy. Additionally or alternatively, the use of meta-classification via a trained model of classifier decision patterns may represent a higher-level classification model aimed at high accuracy classification that is decoupled from the specific feature set or base models being employed by the system. Example embodiments may also enable accurate geolocation of detections to be achieved using imaging sensor properties and digital elevation data. Example embodiments may also provide for an automated process for detecting specific objects of tactical importance from one or more images, which may include panchromatic satellite images or other image modalities such as, for example, infrared (IR), multi-spectral (MSI) bands, hyper-spectral (HSI) bands, full-motion-video (FMV) frames, and/or the like. Thus the descriptions herein relating to satellite imagery should be understood to represent a single, non-limiting example. Human interaction, although not required, may be utilized to provide feedback that can be used to improve system performance.

Figure 8:
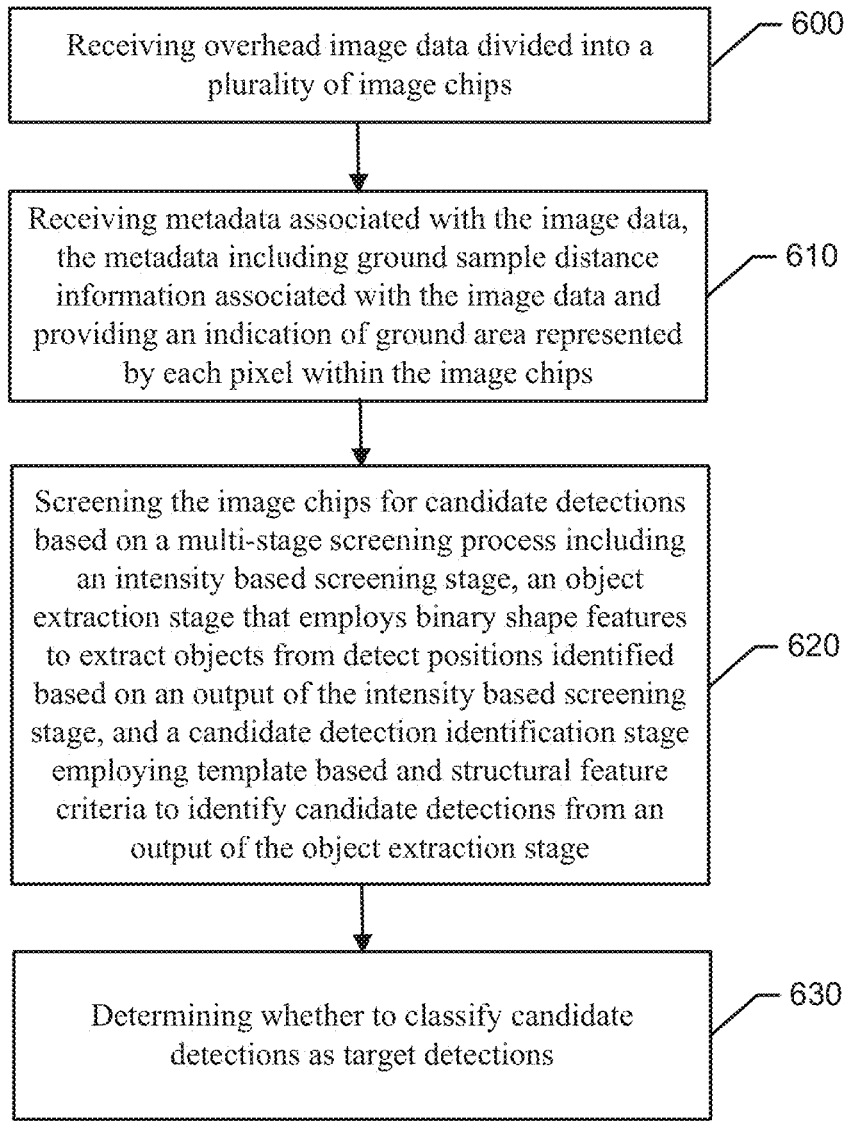
FIG. 8 shows an exemplary block diagram of a method according to an example embodiment.

FIG. 8 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of determining the presence of a target according to one embodiment of the invention is shown in FIG. 8. The method of FIG. 8 may entirely, or at least in part, be executed automatically (e.g., without operator interaction to initiate each step or the series of steps) by processing circuitry. The method may include receiving overhead image data divided into a plurality of image chips at operation 600 and receiving metadata associated with the image data at operation 610. The metadata includes ground sample distance information associated with the image data and provides an indication of ground area represented by each pixel within the image chips. The method may further include screening the image chips for candidate detections based on a multi-stage screening process at operation 620 and determining whether to classify candidate detections as target detections at operation 630. The multi-stage screening process may include stages including an intensity based screening stage, an object extraction stage that employs binary shape features to extract objects from detect positions identified based on an output of the intensity based screening stage, and a candidate detection identification stage employing template based and structural feature criteria to identify candidate detections from an output of the object extraction stage.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. In an example embodiment, screening the image chips may include employing a plurality of trained models to screen the image chips where each of the trained models outputs a label and corresponding confidence level based on an output of the multi-stage process. In such an example, determining whether to classify candidate detections as target detections may include employing fusion of the labels and corresponding confidence levels generated by each respective one of the trained models. In some cases, the fusion may be conducted on the basis of selecting classifier output based on testing accuracy of the trained models, selecting classifier output based on which of the trained models generates a maximum confidence level, generating classifier output based on average confidence level of the trained models, or employing a voting strategy to determine classifier output. In an example embodiment, the fusion may be conducted on the basis of employing a weighted voting strategy to determine classifier output. In some embodiments, determining whether to classify candidate detections as target detections may include employing a meta classifier to evaluate decision patterns to provide a consensus label and confidence value for each candidate detection. In an example embodiment, the method may further include enabling an operator to provide feedback on label assignment for use in model training and/or outputting a label of a classification of the candidate detection and providing corresponding confidence level based on a result of the determining. In such examples, the label may define the classification as a target or clutter, and the confidence level may be defined as a value between a maximum and minimum confidence level (e.g., 0 to 1). In some embodiments, employing template based and structural feature criteria to identify candidate detections may include employing deformable templates, Hough Transforms, Fast Fourier Transform (FFT) based angle measures, parallel line based measures, or edge directivity measures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A detection system comprising processing circuitry configured to:
   receive overhead image data divided into a plurality of image chips;
   receive metadata associated with the image data, the metadata including ground sample distance information associated with the image data and providing an indication of ground area represented by each pixel within the image chips;
   screen the image chips for candidate detections based on a multi-stage screening process, the multi-stage process including:
      an intensity based screening stage,
      an object extraction stage that employs binary shape features to extract objects from detect positions identified based on an output of the intensity based screening stage, and
      a candidate detection identification stage employing template based and structural feature criteria to identify candidate detections from an output of the object extraction stage; and
   determine whether to classify candidate detections as target detections.

2. The detection system of claim 1, wherein the processing circuitry is configured to screen the image chips by employing a plurality of trained models, each of the trained models outputting a label and corresponding confidence level based on an output of the multi-stage process.

3. The detection system of claim 2, wherein the processing circuitry is configured to determine whether to classify candidate detections as target detections based on fusion of the labels and corresponding confidence levels generated by each respective one of the trained models.

4. The detection system of claim 3, wherein the fusion is conducted on the basis of:
   selecting classifier output based on testing accuracy of the trained models;
   selecting classifier output based on which of the trained models generates a maximum confidence level;
   generating classifier output based on average confidence level of the trained models; or
   employing a voting strategy to determine classifier output.

5. The detection system of claim 3, wherein the fusion is conducted on the basis of employing a weighted voting strategy to determine classifier output.

6. The detection system of claim 2, wherein the processing circuitry is configured to determine whether to classify candidate detections as target detections based on employing a meta classifier to evaluate decision patterns to provide a consensus label and confidence value for each candidate detection.

7. The detection system of claim 2, wherein the processing circuitry is further configured to enable an operator to provide feedback on label assignment for use in model training.

8. The detection system of claim 1, wherein the processing circuitry is further configured to output a label of a classification of the candidate detection and provide corresponding confidence level based on a result of the determining.

9. The detection system of claim 8, wherein the label defines the classification as a target or clutter, and wherein the confidence level is defined as a value between a maximum and minimum confidence level.

10. The detection system of claim 1, wherein the processing circuitry is configured to employ template based and structural feature criteria to identify candidate detections by employing deformable templates, Hough Transforms, Fast Fourier Transform (FFT) based angle measures, parallel line based measures, or edge directivity measures.

11. The detection system of claim 1, wherein the processing circuitry is configured to employ the ground sample distance to compute normalized features for scale invariant classification.

12. The detection system of claim 1, wherein the metadata further includes sensor model information, and wherein the processing circuitry is configured to employ the sensor model information in association with a mensuration library to assign accuracy information to a target detection.

13. A method comprising:
   receiving overhead image data divided into a plurality of image chips;
   receiving metadata associated with the image data, the metadata including ground sample distance information associated with the image data and providing an indication of ground area represented by each pixel within the image chips;
   screening the image chips for candidate detections based on a multi-stage screening process, the multi-stage process including:
      an intensity based screening stage,
      an object extraction stage that employs binary shape features to extract objects from detect positions identified based on an output of the intensity based screening stage, and a candidate detection identification stage employing template based and structural feature criteria to identify candidate detections from an output of the object extraction stage; and determining whether to classify candidate detections as target detections.

14. The method of claim 13, wherein the screening the image chips comprises employing a plurality of trained models to screen the image chips, each of the trained models outputting a label and corresponding confidence level based on an output of the multi-stage process.

15. The method of claim 14, wherein determining whether to classify candidate detections as target detections comprises employing fusion of the labels and corresponding confidence levels generated by each respective one of the trained models.

16. The method of claim 15, wherein the fusion is conducted on the basis of:

selecting classifier output based on testing accuracy of the trained models;

selecting classifier output based on which of the trained models generates a maximum confidence level;

generating classifier output based on average confidence level of the trained models; or employing a voting strategy to determine classifier output.

17. The method of claim 15, wherein the fusion is conducted on the basis of employing a weighted voting strategy to determine classifier output.

18. The method of claim 14, wherein determining whether to classify candidate detections as target detections comprises employing a meta classifier to evaluate decision patterns to provide a consensus label and confidence value for each candidate detection.

19. The method of claim 14, further comprising enabling an operator to provide feedback on label assignment for use in model training.

20. The method of claim 13, further comprising outputting a label of a classification of the candidate detection and providing corresponding confidence level based on a result of the determining.

* * * * *